United States Patent [19]
Yoshizumi

[11] Patent Number: 4,776,699
[45] Date of Patent: Oct. 11, 1988

[54] OPTICAL MEASURING DEVICE
[75] Inventor: Keiichi Yoshizumi, Osaka, Japan
[73] Assignee: Matsushita Electric Industrial Co., Ltd, Osaka, Japan
[21] Appl. No.: 881,283
[22] Filed: Jul. 2, 1986
[30] Foreign Application Priority Data
  Jul. 5, 1985 [JP] Japan .................. 60-148715
[51] Int. Cl.$^4$ .............................................. G01B 9/02
[52] U.S. Cl. ........................ 356/349; 356/360
[58] Field of Search ............ 356/124, 349, 360, 376

[56] References Cited
U.S. PATENT DOCUMENTS

| | | | |
|---|---|---|---|
| 3,877,788 | 4/1975 | Sprague et al. | 356/124 |
| 3,977,789 | 8/1976 | Hunter et al. | 356/124 |
| 4,139,304 | 2/1979 | Redman et al. | 356/358 |
| 4,148,587 | 4/1979 | Erdmann et al. | 356/356 |
| 4,353,650 | 10/1982 | Sommargen | 356/371 |
| 4,611,916 | 9/1986 | Yoshizumi | 356/360 |

FOREIGN PATENT DOCUMENTS

| | | | |
|---|---|---|---|
| 0108497 | 5/1984 | European Pat. Off. | |
| 0126475 | 11/1984 | European Pat. Off. | |
| 2528209 | 1/1979 | Fed. Rep. of Germany | |
| 0104206 | 6/1985 | Japan | 356/349 |
| 1472894 | of 0000 | United Kingdom | |

Primary Examiner—F. L. Evans
Attorney, Agent, or Firm—Stevens, Davis, Miller & Mosher

[57] ABSTRACT

An optical measuring device adapted to irradiate a measuring beam on the surface of an object to be measured which is being moved relative to the measuring beam, and detect the Doppler shift of the reflected rays of the measuring beam so as to measure the surface configuration and the sizes of the object. The incident rays of the measuring beam are condensed on the surface of the object by an objective lens such that the rays reflected from the object follows the same optical path as that of the incident ray, a part of the rays reflected by the surface of the object is branched off and received by a first photodetector means including a quarter-sectioned photodetector so that the deviation of the optical path of the reflected rays from the optical path of the incident rays is detected when the inclination of the surface of the object changes, and the optical path of the incident rays is moved in the direction normal to the optical axis of the objective lens in correspondence with a signal output from the first photodetector means and indicative of the deviation, so as to avoid changing the lengths of the optical paths of the reflected rays and the incident rays.

7 Claims, 5 Drawing Sheets

OPTICAL MEASURING DEVICE

BACKGROUND OF THE INVENTION

1. Field of the Invention

The present invention relates to an optical measuring instrument for optically measuring the surface configuration of such objects as a lens and a mirror which have a spherical surfaces and of objects with any kind of arbitrarily curved surface, by using a laser gauge interferometer employing the optical heterodyning technique, such as a laser interferometer of the Mach-Zehnder interferometer type or the like, so as to conduct the optical measurement with high precision and without making direct contact with the object surfaces. More particularly, the present invention relates to an optical measuring device which is adapted to condense a measuring beam on the surface of an object to be measured, detect the Doppler shift caused by a movement of the measuring spot of reflected rays of the measuring beam detected in terms of the frequency of the reflected rays or by a movement of the surface of the object, thereby measuring the configuration of the surface of the object.

2. Related Background Art

Among gauge measuring devices of various types heretofore known, a laser gauge interferometer employing the optical heterodyning technique is superior in terms of simplicity and measuring precision. Further, the laser gauge interferometer of this type enjoys wide use, that is, it can be applied in a three-dimensional measuring instrument or a precision lathe when it is mounted on a table movable in three dimensions.

In the known gauge measuring devices, a movable table on which an object to be measured is mounted is provided with a corner cube or a mirror, whereby movements of the movable table alone can be measured by a laser gauge interferometer. When the device is applied as a three-dimensional measuring instrument, the surface configuration of the object is measured by a suitable measurement probe while moving the table. There are two types of probes employed, namely, the contact type and the non-contact type. However, these types of probes cannot have the precision of measurement which is provided by a laser gauge interferometer.

In order to overcome the above-mentioned problem, the present applicant has proposed a new measuring device as disclosed in Japanese Patent Laid-Open No. 59-79104 (corresponding to U.S. patent application No. 609,196, dated May 11, 1984). The proposed device is adapted to radiate a laser beam directly onto an object to be measured without the intermediary of a contact type probe, thereby measuring the surface configuration of the object by the laser interferometric measuring method in accordance with the optical heterodyning technique. More specifically, the proposed measuring device comprises means for radiating a measuring beam modulated by a predetermined frequency and for condensing the measuring beam on the surface of an object to be measured through an objective lens, focus servo means for maintaining the distance between the objective lens and the surface of the object to be measured at a constant value, an inclination correcting servo means operable to move the objective lens or the ray axis of incident rays of the measuring beam in a direction which is normal to the optical axis of the objective lens such that the incident rays of the measuring beam and reflected rays thereof can follow substantially the same optical path, i.e. they can substantially overlap each other along their optical paths, and means for moving the object to be measured at a constant speed. Thus, the proposed device radiates a measuring laser beam toward an object to be measured without the intermediary of a measuring probe, and detects the Doppler shift of reflected rays of the measuring laser beam, thereby measuring the surface configuration of the object to be measured by the optical heterodyning technique.

FIG. 1 shows the arrangement of the proposed device as a conventional device, wherein arrows X, Y and Z represent X-Y-Z orthogonal coordinates. A beam having a frequency F1 and a frequency F2 is radiated from an He-Ne Zeeman frequency stabilizing laser (not shown), and is separated into two bundles of rays by a half mirror 27. The difference between the frequencies F1 and F2 is on the order of several hundred KHz to several MHz. The two bundles of rays have the planes of polarization thereof normal to each other. Parts of the separated rays are used for detection of the X-Y components on the X-Y coordinates, as hereinafter explained, while the rest of the rays are used for detection of the Z component on the Z coordinate as described hereinunder.

After transmission through the half mirror 27, the rays are split into the measuring rays having the frequency F1 and the reference rays having the frequency F2 by a polarizing prism 12. The measuring rays are focused on the surface of an object 1 to be measured by an objective lens 2 through a polarizing prism 11, a quarter-wavelength plate 7a and a mirror 15a. On the other hand, the reference rays are irradiated on a reference mirror 16 mounted on a movable table A together with the object 1 to be measured through a quater-wavelength plate 7b, a lens 13, and mirrors 15b and 15c. The table A on which the object 1 is mounted is movable in the directions of X and Y along a plane defined by the X-Y coordinates. When the table A is moved along the X-Y plane, there occurs a change in the thickness of the object 1 to be measured, i.e., in the Z component of the measuring spot on the surface of the object 1, causing a corresponding change in the length of the optical path of the measuring rays. Thus, the reflected rays of the measuring rays have a frequency (F1+Δ) which is different from that (F1) of the measuring ray by a differential frequency Δ due to the Doppler shift. The reflected rays of the measuring rays are inputted to a photodetector 18 through the objective lens 2, mirror 15a, quater-wavelength plate 7a, and polarizing prisms 11 and 12.

Meanwhile, the reference rays are reflected by the highly accurate reference mirror 16 having a profile irregularity of less than 10 nm. The reflected rays of the reference rays, however, have a frequency (F2+δ) which is different from that (F2) of the reference rays by a differential frequency δ depending upon the Doppler shift and corresponding to an error in the straightness of movement of the table A from the X-Y plane, which is normal to the Z coordinate. The reflected rays of the reference rays are inputted to the photodetector 18 through the mirrors 15c, 15b, lens 13, quater-wavelength plate 7b and polarizing prism 12. The reflected rays of the measuring rays and the reflected rays of the reference rays are synthesized by the polarizing prism 12, and the difference (F1+Δ)−(F2+δ) between the frequencies of them is detected by the photodetector 18 as a beat signal. The frequency of the beat signal is detected by a detecting circuit 19, to thereby obtain an accurate measurement value of the Z component indicating the thickness of the object 1.

On the other hand, the X-Y components of the measuring spot are measured in a similar manner by detecting the positional difference between a mirror 22 arranged on the side of the objective lens 2 and a mirror 21 mounted on the movable table A integrally with the object 1, on account of rays having the F1 and F2 frequencies, which are reflected by the half mirror 27.

More specifically, the measuring rays having the frequency F1 are transmitted to the mirror 22 through a mirror 15, a polarizing prism 23, and a quater-wavelength plate 7c and are reflected by the mirror 22. Then, the reflected rays of the measuring rays are again transmitted from the mirror 22 through the quater-wavelength plate 7c, polarizing prism 23, a corner cube 24, the polarizing prism 23 and quater-wavelength plate 7c, and again reflected by the mirror 22 finally reaching a photodetector 25 through the quater-wavelength plate 7c and polarizing prism 23. On the other hand, the reference rays having the frequency F2 are transmitted to the mirror 21 through the mirror 15, polarizing prism 23, a quater-wavelength plate 7d and a mirror 15d, and reflected the mirror 21. Then, the reference rays which have been reflected by the mirror 21, is transmitted through the mirror 15d, quater-wavelength plate 7d, polarizing prism 23, corner cube 24, polarizing prism 23, quater-wavelength plate 7d and mirror 15d, and is again reflected, finally reaching the photodetector 25 through the mirror 15d, quater-wavelength plate 7d, and polarizing prism 23. When the measuring rays and the reference rays are reflected by the mirrors 22 and 21, respectively, Doppler shifts are caused by the movements of the objective lens 2 and the movable table A, respectively. The photodetector 25 detects the difference between the frequencies of the reflected rays of the measuring rays and the reference rays as a beat signal. A detecting circuit 26 calculates the X-Y components of the measuring spot from the frequency value of the beat signal.

The conventional device described as above is adapted such that when the surface of the object to be measured is inclined the objective lens 2 or the optical path of the incident rays of the measuring rays is moved in a direction which is normal to the optical axis of the objective lens, thereby making it possible for the incident rays and the rays of the measuring rays which are reflected to follow substantially the same optical paths. However, if the objective lens is moved by a driving means 20, the measuring spot is also moved in correspondence with the movement of the objective lens. On the other hand, if the optical path of the incident rays is moved in a direction which is normal to the optical axis of the objective lens by moving the mirror 15a, it happens, in general, that the length of the optical path of the incident rays is correspondingly changed. Such a change in the length of the optical path is undesirable because the optical path length per se constitutes the relevant measurement data. In order to correct the change in the length of the optical path, the latter has to be measured with as high a precision as required for measuring the object, this being rather difficult to achieve.

On the other hand, the movement of the objective lens 2 can be measured with a high degree of precision. To this end, a laser beam may be radiated on the mirror 22 (FIG. 1) arranged on the side of the objective lens.

However, even if the X-Y components of the measuring spot can be detected with high precision by thus measuring the movement of the objective lens 2, there is still a need to compensate for the movement of the measuring spot from its originally intended position. To this end, however, it is impossible to bring the measuring spot from its actual position to the originally intended position in an open-loop manner because the measuring spot which is located on the optical axis of the objective lens always moves in correspondence with the movement of the objective lens which in turn moves in accordance with the inclination of the surface of the object to be measured. Instead, the measuring spot has to be brought back from its actual position to the originally intended position in a feedback manner by a focus servo means which operates to minimize the difference between the actual and intended positions of the measuring spot. Thus, the problem of how to compensate for the movement of the measuring spot which is caused by the inclination of the surface of the object to be measured is something which needs to be solved before it will be possible to improve the measuring precision and to develop various functions of the measuring device.

SUMMARY OF THE INVENTION

Objects of the Invention

Accordingly, it is an object of the invention to provide an optical measuring device which is adapted to radiate a measuring beam on the surface of a measurement object being relatively moved with respect to the measuring beam, and to measure the surface configuration and the sizes of the object by detecting the Doppler shift of the reflected rays of the measuring beam, wherein the position of the desired measuring spot onto which the measuring beam needs to be radiated can be determined with ease.

It is another object of the invention to provide an optical measuring device which is capable of properly changing the radiation angle of the measuring beam in accordance with the inclination of the object to be measured without causing any movement in the position of the measuring spot.

It is a further object of the invention to provide an optical measuring device which is capable of properly changing the radiation angle of the measuring beam without causing any change in the length of the optical paths of the incident rays of the measuring beam and of reflected rays thereof.

To these ends, according to the present invention, the optical measuring device comprises: beam radiating means which radiates a measuring beam composed of rays substantially parallel to the optical axis of the measuring beam, an objective lens which condenses the incident rays of the measuring beam on the surface of an object to be measured which is relatively movable with respect to the measuring beam along a plane, first photodetector means such as, for example, a quater-sectioned detector which receives a part of the reflected rays of the measuring beam which have been reflected by the surface of the object to be measured, and outputs an error signal, and correcting means which moves the optical path of the incident rays in the direction normal to the optical axis of the objective lens in correspondence with the signal, while the lengths of the optical paths of the incident and reflected rays are left to be unchanged.

According to one aspect of the invention, the inclination change correcting means comprises a beam splitter through which rays of the measuring beam are transmitted before incidence of the rays upon the objective lens, a condenser lens which condenses the rays of the measuring beam which have been transmitted through the beam splitter, to a mirror which reflects the rays of the measuring beam that is then reflected by the beam splitter. Thereby the incident rays of the measuring beam can be subjected to parallel displacement so as not to cause the lengths of the optical paths of the incident and reflected rays to vary.

By virtue of the provision of the above-mentioned means for use with the optical measuring device according to the present invention, the measuring beam composed of rays substantially parallel with the optical axis of the measuring beam, which is made incident on the surface of the object to be measured by the objective lens can be moved in a direction normal to the optical axis of the objective lens, and thus no change takes place in the optical path length of the measuring beam, thereby preventing errors in measurement of the Z component of the measuring spot even if the inclination of the object to be measured changes. Further, the incident rays of the measuring beam can be made incident on the objective lens in a direction parallel to the optical axis of the objective lens, so that no change takes place in the light condensed position by the objective lens, thus preventing errors in measurement of the X-Y components of the measuring spot even with a change in the inclination of the object to be measured.

DETAILED DESCRIPTION OF THE INVENTION

Figure 2:
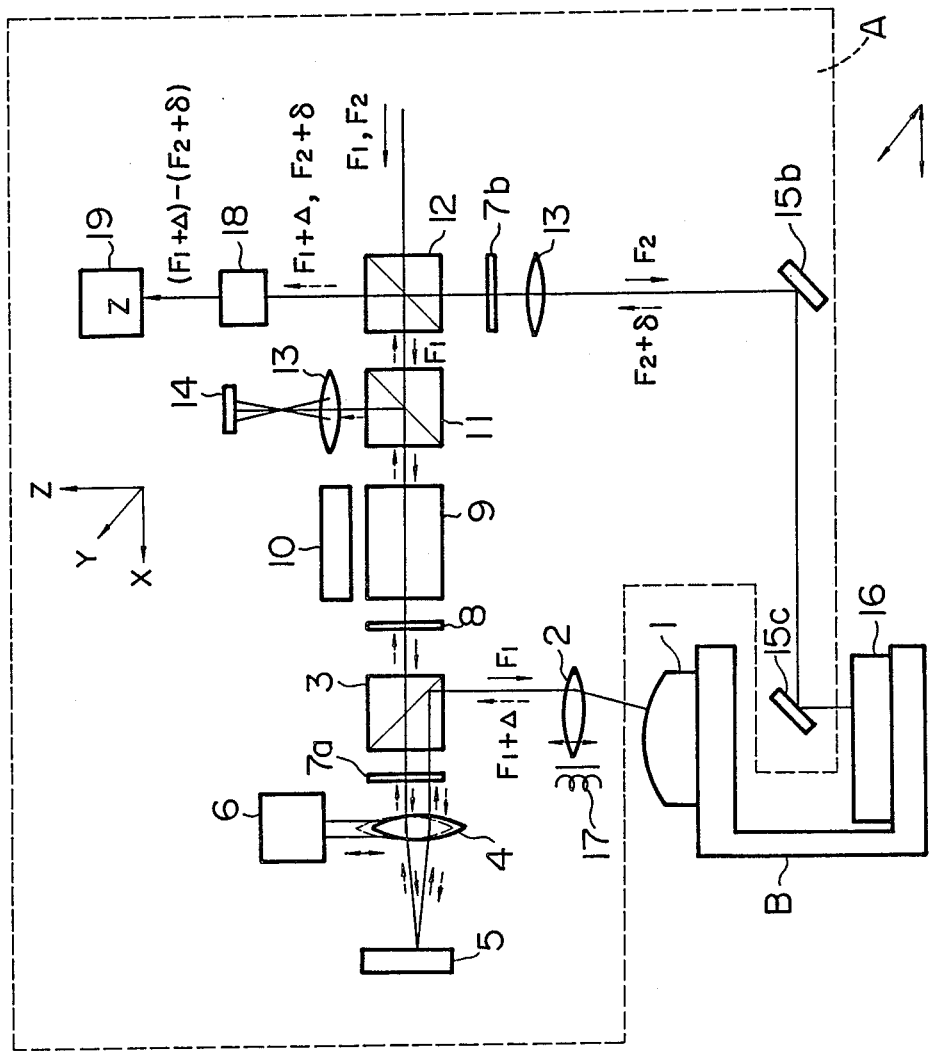
FIG. 2 is a view schematically showing the optical system of a first embodiment of the optical measuring device according to the invention.

FIG. 2 shows the optical system of a first embodiment of the optical measuring device according to the invention. In the embodiments, the measurement of the X-Y components of the measuring spot may be conducted in a similar manner to that described hereinbefore in relation to the conventional device. Therefore, illustration of the part of the system for measuring the X-Y components is omitted from FIGS. 2 to 5, also omitted is a specific description of that part of the system from the following.

A frequency stabilizing He-Ne Zeeman laser (not shown) radiates a laser beam composed of rays whose planes of polarization are normal to each other, and which have frequencies F1 and F2. A half mirror (not shown) separates a part of the rays for measuring the X-Y components of the measuring spot in the same way as in the conventional device of FIG. 1.

The rays having the frequencies F1 and F2, are split by a polarizing prism 12 which acts as a beam splitter into a bundle of rays of frequency F1 and another bundle of rays of frequency F2, which will be referred to respectively as "measuring rays" and "reference rays". The plane of polarization of the measuring rays F1 is rotated through 45° degrees by a Faraday element 9 provided with a magnet 10, after they are transmitted through a special polarizing prism 11. The plane of polarization of the measuring rays is then rotated through −45° degrees by a half-wavelength plate 8, and therefor the measuring rays have P polarized waves which can be totally transmitted through a polarizing prism 3. The measuring rays are then condensed on a mirror 5 through a quater-wavelength plate 7a and a condenser lens 4. The part of the measuring rays F1 reflected by the mirror 5 are turned into S polarized waves by the quater-wavelength plate 7a, and then, after being totally reflected by the polarizing prism 3, the reflected rays are made incident on an objective lens 2, and are focused thereby onto the surface of an object 1 to be measured.

The objective lens 2 is driven by a coil 17 constituting a focus servo loop, to focus always the measuring light rays onto the surface of the object 1 to be measured, that is, the lens 2 is driven in the direction of Z, i.e., in the direction parallel with the ray axis of the measuring rays, and is subjected to a focus servo-control. As a method for detecting an error signal of the focus servo means, a method comprising the step of detecting the error signal from the measuring rays reflected from the surface of the object to be measured, as disclosed in the above-mentioned Japanese Patent Laid-Open No. 59-79104 (corresponding to U.S. patent application No. 609,196) may be employed, the details of which are omitted herein for simplification. The disclosure of the U.S. application Ser. No. 609,196 is incorporated herein by reference. In addition, there is a method as disclosed in Japanese Patent Laid-Open No. 59-228114 may be employed: that comprises the step of mixing a semiconductor laser beam with the measuring rays of the He-Ne laser beam with the use of a dichroic mirror in such a manner that the optical paths of the beams overlap each other, so as to obtain the error signal of the focus servo means by the semiconductor laser beam.

Figure 1:
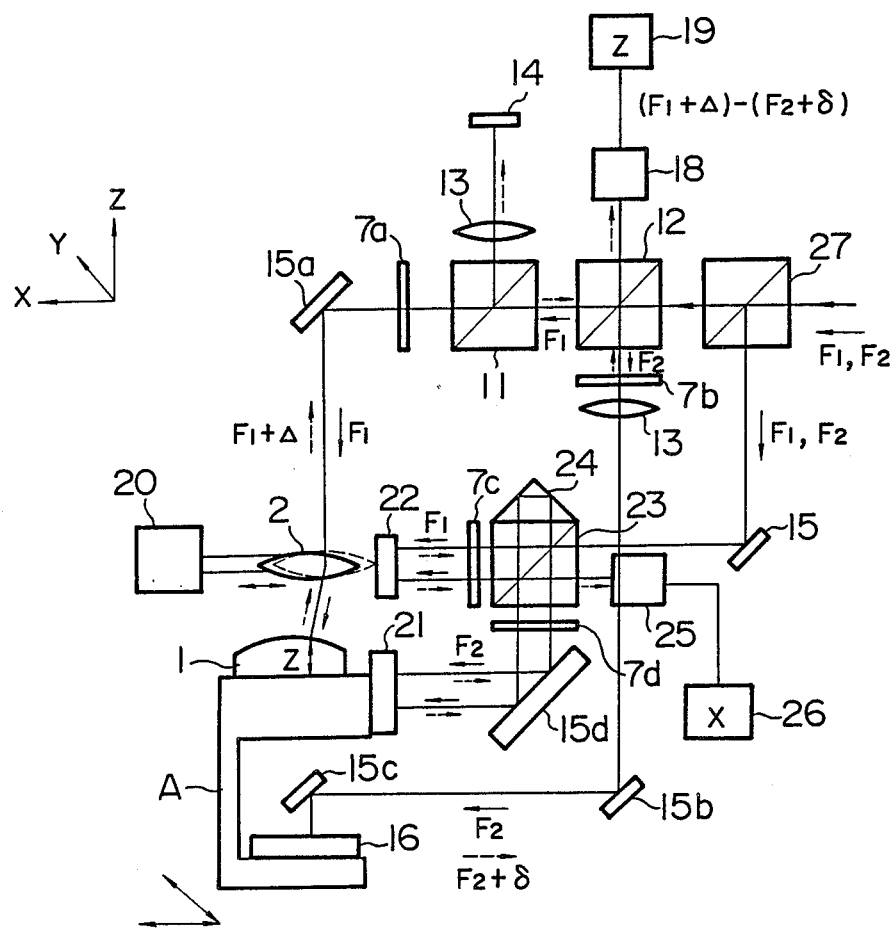
FIG. 1 is a view schematically showing the optical system of a conventional optical measuring device.

In FIG. 1, although the incident rays are shown as a single straight line, the incident rays are actually a bundle of rays having a diameter of about 2 mm, which are irradiated onto the surface to be measured after being focused by the objective lens 2 into a spot of a diameter of about 2 to 3 μm. The effective aperture of the objective lens 2 is 4.3 mm.

The rays reflected by the object 1 to be measured have a frequency (F1+Δ) which is changed from the frequency F1 of the incident rays due to the Doppler shift caused by the movement of the object 1 to be measured along the plane defined by the X-Y coordinates and by the surface configuration of the object to be measured 1. The reflected rays follow exactly the same optical path as the incident rays, but in the reverse direction, i.e. they return to the polarizing prism 3 through the objective lens 2, polarizing prism 3, quater-wavelength plate 7a, condenser lens 4, mirror 5, condenser lens 4, and quater-wavelength plate 7a. Thereafter, the reflected rays are turned into S polarized waves by the half-wavelength plate 8 and the Faraday element 9. A part of the reflected rays is then reflected by the special polarizing prism 11, while the rest of the rays are totally reflected by the polarizing prism 12, and then reach a photodetector 18.

However, if a change occurs in the inclination of the surface of the object 1, the reflected rays tends to follow an optical path which deviates from the optical path of the incident ray in accordance with the inclination change. Therefore, according to the invention, the device is provided with inclination change correcting means which operates in such a way that any deviation of the optical path of the reflected rays from that of the incident rays is detected by a condenser lens 13 and a quater-sectioned photodetector 14 which refer to the part of the reflected rays which have been separated by the special polarizing prism 11, and the position at which the incident rays are incident on the objective lens 2 is corrected by moving the condenser lens 4 which is driven by a condenser lens driving circuit 6 along a plane defined by the Y-Z coordinates, i.e., in a direction normal to the optical path of the measuring rays incident on the condenser lens 4. As a result, the optical path of the rays incident on the objective lens 2 is moved as appropriate in a direction normal to the optical axis of the objective lens 2, thereby controlling the optical path of the reflected measuring rays so that they reflects back along the same optical path as the incident rays thereof.

The following gives the reasons why no change in the optical path length, and therefore no measurement errors are caused in accordance with the invention. Assume that both the condenser lens 4 and the objective lens 2 have no aberration. Then, when measuring rays which are parallel to the optical axis of the condenser lens 4 are incident on the condenser lens 4 at any position thereon, they can be all focused onto the optical axis of the lens 4 without causing any change in the optical path lengths. Further, if the condenser lens 4 is moved along the Y-Z plane, its focal point (i.e. the condensing position) also moves correspondingly on the reflection surface of the mirror 5. In this case, however, if the reflection surface of the mirror 5 is located on the Y-Z plane and if the reflection surface has a high degree of flatness, no substantial variation will be appreciated in the optical path length. Furthermore, the orientation of the reflection surface of the polarizing prism 3 at 45° with respect to the optical path helps to maintain the entire optical path length of the rays reflected by the object 1 to be measured to be unchanged. Therefore, only limited factors can cause a change in the optical path length, such as degrees of aberration of the condenser lens 4 and the objective lens 2, and the degree of flatness of the mirror 5. Changes in the optical path length caused by these factors can be reduced to a level of not more than 40 nm without difficulty.

In the optical system shown in FIG. 2, the object to be measured 1 and a reference mirror 16 are secured on a fixed table B, while the rest of the elements of the system are mounted on the X-Y movable table A, and further the objective lens 2 can be moved in the direction of Z by the focus coil 17. When the error signal of the focus servo means is to be obtained by a semiconductor laser, as disclosed in Japanese Patent Laid-Open No. 59-228114, an error signal detecting optical system, not shown, including the semiconductor laser is arranged in such a manner that it can be moved integrally with the objective lens 2 in the Z direction.

As the measuring spot is moved from one position to another on the surface of the object 1 to be measured, the frequency of the reflected rays is shifted to a value of $(F1+\Delta)$ due to the Doppler shift in response to the speed with which the Z component of the measuring spot changes.

Meanwhile, the reference rays F2 are focused onto the reference mirror 16 through the quater-wavelength plate 7b, the condenser lens 13, and mirrors 15b, 15c, after they have been split by the polarizing prism 12. The reference rays reflected by the mirror 16 are inputted to the photodetector 18 after following the same optical path as that described above, but in the reverse direction.

By the operation of the above inclination change correcting means, the reflected measuring rays and reference rays can always be overlapped with each other on the photodetector 18 to cause interference with each other, thereby generating a beat signal having a frequency of $(F1+\Delta)-(F2+\delta)$. The photodetector 18 has a polarizing plate for aligning the polarization directions of the reflected measuring rays and reference rays. The Z component of the measuring spot can then be obtained by calculating the value of $(F1+\Delta)-(F2+\delta)$ of the beat signal.

In the above optical system, the X-Y movable table which is movable along the X-Y plane even with a highest degree of accuracy can be moved with a straightness of at most ±100 nm. However, the degree of flatness of the mirror 16 is on the order of ±10 nm. Therefore, the straightness of the movable table A of ±100 μm can be corrected as a Doppler shift δ, thus causing no adverse effect on the precision of the measurement. As a consequence, the precision of the measurement of the Z component is influenced only by the degree of flatness of the mirror 16.

Second to fifth embodiments of the invention will now be described with reference to FIGS. 3 to 5. In these figures, elements corresponding to those of the first embodiment are designated by the same numerals, and detailed descriptions of these elements will be omitted.

Figure 3:
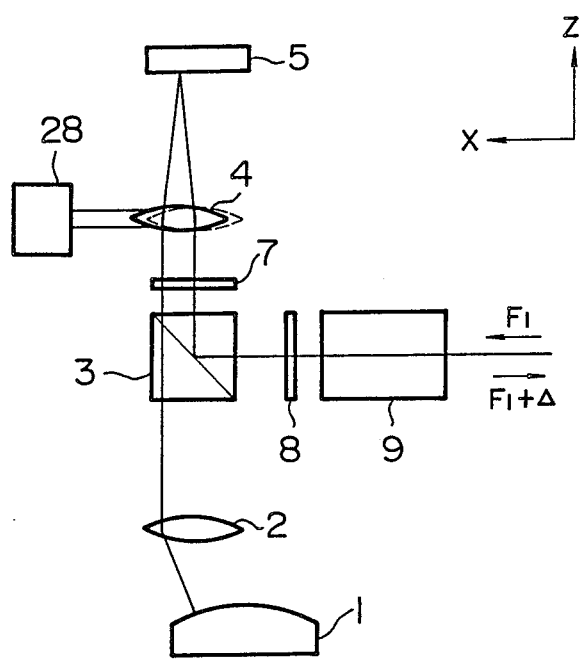
FIG. 3 is a view schematically showing the essential parts of the optical system of second embodiment of the optical measuring device according to the invention.

FIG. 3 shows the essential parts of the optical system of the second embodiment of the invention. The optical system operates in substantially the same manner as the system of the first embodiment, except that the incident rays are reflected by the polarizing prism 3 as S polarized waves, and after they are reflected by the mirror 5, the reflected rays are transmitted through the polarizing prism 3. In FIG. 3, numeral 28 designates a driving means for the condenser lens 4.

Figure 4:
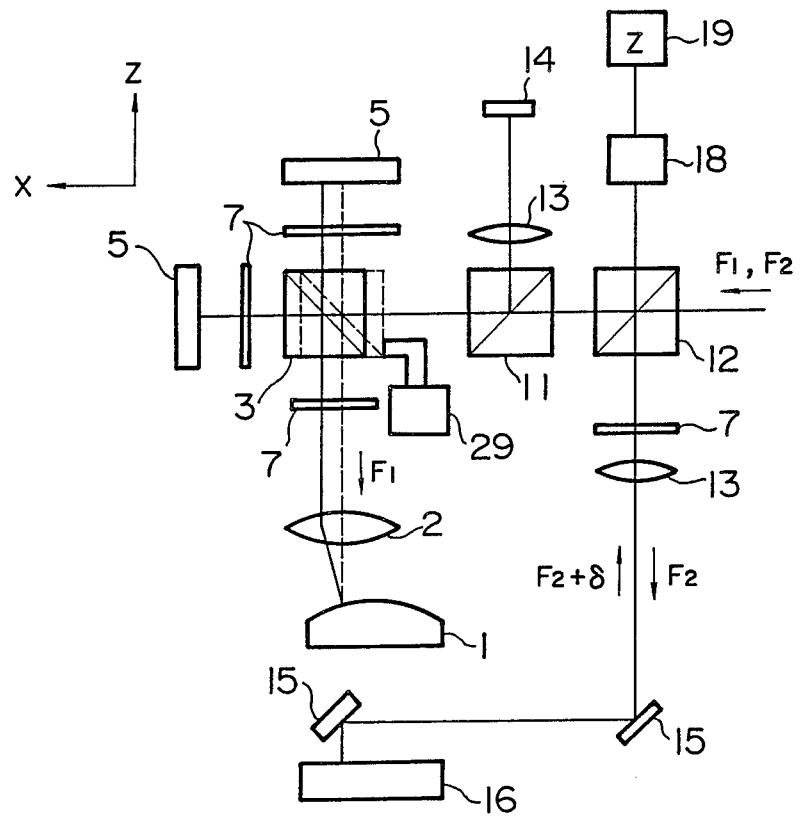
FIG. 4 is a view schematically showing the essential parts of the optical system of a third embodiment of the optical measuring device according to the invention.

FIG. 4 shows the essential parts of the optical system of the third embodiment of the invention. In this embodiment, the measuring rays are transmitted through the polarizing prism 3, reflected by the mirror 5, and thereafter reflected by the polarizing prism 3 under the action of the quater-wavelength plate 7, and are then incident on the objective lens 2. The reflected rays from the object 1 to be measured are transmitted through the polarizing prism 3 under the action of a quater-wavelength plate 7', reflected by a mirror 5', reflected by the polarizing prism 3, and finally returned in the reverse (−X) direction. Thereafter, as in the first embodiment, a part of the reflected rays reaches the quater-sectioned photodetector 14 through the special polarizing prism 11 and the condenser lens 13, an error signal indicative of a inclination of the surface is generated, and the polarizing prism 3 is moved as appropriate in the direction of ±X, as shown in FIG. 4, by prism driving means 29.

In this case, as shown in the figure, as the prism 3 is moved in the ±X direction, the optical path of the measuring rays incident on the objective lens 2 is subjected to parallel displacement, with no change in the length of the optical path of the reflected rays and that of the incident rays. In this way, according to the third embodiment of the invention, the optical path of the rays incident on the objective lens 2 can be moved only in the directions of ±X.

As in the system according to the above third embodiment, it is also possible to arrange the system such that the measuring rays are reflected by the polarizing prism 3 in the direction of Z as S polarized waves before they are reflected by the mirror 5', and that the reflected rays are transmitted through the polarizing prism 3 to the objective lens 2, as in the second embodiment. This arrangement is the fourth embodiment of the invention.

Figure 5:
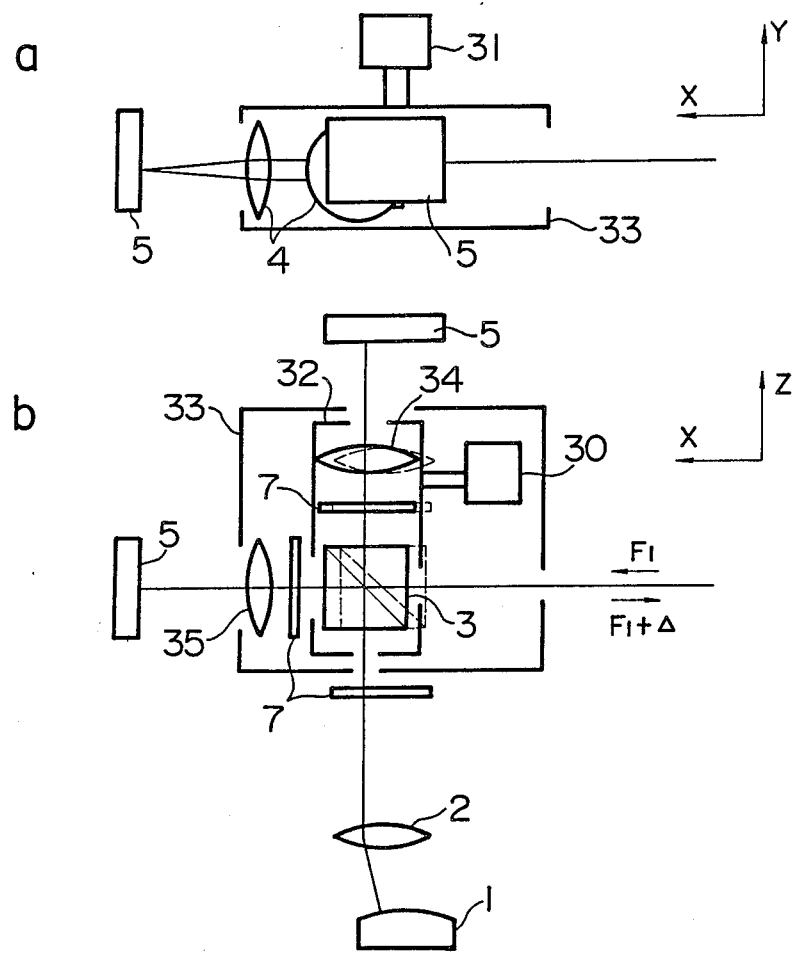
FIGS. 5(a) and 5(b) are views schematically showing the essential parts of the optical system of a fifth embodiment of the optical measuring device according to the invention.

FIGS. 5(a) and 5(b) show the essential parts of the optical system of the fifth embodiment of the invention. In the fifth embodiment, the systems according to the first and third embodiments are combined. More specifically, as shown in FIG. 5(a), the polarizing prism 3 and a condenser lens 34 are integrally moved by ±X direction driving means 30 in the directions of ±X, so as to compensate the inclination in the direction X. Further, as shown in FIG. 5(b), the polarizing prism 3, and condenser lenses 34, 35 are integrally moved by ±Y direction driving means 31 in the directions of ±Y, so as to compensate the inclination in the direction of Y. In the system according to the fifth embodiment, measuring rays may first be reflected by the polarizing prism 3 and are then transmitted therethrough, as in the second to fourth embodiments. In FIG. 5, numerals 32 and 33 designate frames enclosing the portions of the optical system which are movable in the directions of ±X and in the directions of ±Y, respectively.

The optical system according to the fifth embodiment operates to move the optical axis of the rays incident on the objective lens 2 along a two-dimensional plane (e.g. a plane defined by the X-Y coordinates), and this operation is the same as that of the systems of the first and second embodiments. However, the fifth embodiment is advantageous in that it does not use the Faraday element 9.

As described above, according to the invention, there is provided an optical measuring device adapted to conduct optical measurement in accordance with the optical heterodyning technique and without making direct contact with an object to be measured. In order to prevent the measuring rays from being reflected in different directions by the surface of the object in accordance with the inclination of the surface of the object, the device is capable of parallelly displacing the optical path of the incident rays without causing any change in the length of the optical path of the measuring beam and without causing any change in the position of the measuring spot, thereby eliminating measurement errors and improving the measuring precision.

What is claimed is:

1. An optical measuring device for measuring a surface configuration of an object comprising:

means for radiating incident measuring rays and reference rays;

first optical means for transmitting said incident measuring rays along an incident optical path from said ray radiating means to a surface of an object to be measured set on a table which is movable relative to said measuring rays along a plane, and for transmitting reflected measuring rays reflected from the surface of the object along a reflecting optical path, said first optical means comprising an objective lens for condensing said incident measuring rays onto the surface of said object, second optical means for irradiating said reference rays onto a reference mirror mounted on said movable table, first photodetector means for receiving reflected measuring rays from the suface of said object and transmitted through said first optical means and reflected reference rays reflected from said reference mirror, and for detecting the difference between frequencies of said received rays to provide an indication of the surface configuration of said object, second photodetector means for receiving a part of said incident and reflected measuring rays which pass to and from said object through said first optical means, and for detecting a deviation of said reflecting optical path from said incident optical path and delivering a signal indicative of said deviation, and path inclination correcting means provided in said first optical means and placed in said incident and reflecting optical paths between said radiating means and said objective lens, for optically moving said incident measuring rays and reflected measuring rays reflective to each other in the direction normal to the optical axis of said object lens in correspondence with said signal without causing any deviation in the lengths of said incident and reflecting optical paths in order to maintain said reflecting optical path unchanged irrespective of the inclination of the surface of said object to be measured, thereby to eliminate said deviation of asid reflecting optical path.

2. An optical measuring device as claimed in claim 1, wherein said path inclination correcting means comprises a beam splitter through which said incident measuring rays propagating in a direction of an X-axis of an orthogonal X-Y-Z coordinate system are transmitted, a condenser lens which condenses said measuring rays which have been transmitted through said beam splitter, a mirror which is located at a position corresponding to the condensing position of said condenser lens and which reflects said measuring rays from said condenser lens in the direction of −X, and driving means which moves the condenser lens along a plane defined by X-Y coordinates in correspondence with said signal, said object lens being located at such a position that said meauring rays which have been reflected by said mirror are made to be incident thereon after they have been reflected by said beam splitter in the direction of −Z, and having an optical axis thereof extending in the direction of Z.

3. An optical measuring device as claimed in claim 1, wherein said path inclination correcting means comprises a beam splitter which reflects said measuring rays propagating in the direction of an X-axis of an orthogonal X-Y-Z coordinate system, in the direction of the Z axis, a condenser lens which condenses said measuring rays which have been reflected by said beam splitter, a mirror which is located at a position corresponding to the condensing position of said condenser lens and which reflects said measuring rays in the direction of −Z, and driving means which moves the condenser lens along a plane defined by the X-Y coordinates in correspondence with said signal, said objective lens being located at such a position that said measuring rays which have been reflected by said mirror in the direction of −Z are made to be incident thereon after they have been again transmitted through said beam splitter, and which have an optical axis thereof extending in the direction of Z.

4. An optical measuring deviced as claimed in claim 1, wherein said path inclination correcting means comprises a beam splitter through which said measuring rays propagating in the direction of an X-axis of an orthogonal X-Y-Z coordinate system are transmitted, a first mirror which reflects said measuring rays in the direction of −X, said objective lens being located at such a position that said measuring rays which have been reflected by said first mirror pass after they have been reflected by said beam splitter in the direction of −Z, and said reflected measuring rays pass after they have been reflected by the surface of said object in the direction of Z, said device further comprising a second mirror which reflects in the direction of −Z, said reflected measuring rays which have been reflected by said second mirror being reflected by said beam splitter in the direction of −X, and driving means which moves said beam splitter in the directions of +/−X in correspondence with said signal.

5. An optical measuring device as claimed in claim 1, wherein said path inclination correcting means comprises a beam splitter which reflects said measuring rays propagating in the direction of an X-axis of an orthogonal X-Y-Z coordinate system in the direction of Z, a first mirror which reflects said meauring rays reflected by said beam splitter in the direction of −Z, said objective lens being located at such a position that said measuring rays which have been reflected by said first mirror pass after they have been transmitted through said beam splitter and said reflected measuring rays pass after they have been reflected by the surface of said object in the direction of Z, said device further comprising a second miror which reflects in the direction of −X said reflected measuring rays after they have been passed through said objective lens and reflected by said beam splitter in the direction of X, said reflected measuring rays which have been reflected by said second mirror being transmitted through said beam spitter, and driving means which moves said beam splitter in the directions of +/−X in correspondence with said signal.

6. An optical measuring device as claimed in claim 1, wherein said path inclination correcting means comprises a beam splitter through which said measuring rays propagating in the direction of an X-axis of an orthogonal X-Y-Z coordinate system are transmitted, a first condenser lens which condenses said measuring rays which have been transmitted through said beam splitter, a first mirror which is located at a position corresponding to the condensing position of said first condenser lens and which reflects said measuring rays in the direction of −X, said objective lens being located at such a position that said measuring rays which have been reflected by said first mirror pass after they have been reflected by said beam splitter in the direction of −Z and said reflected measuring rays pass after they have been reflected by the surface of said object in the direction of Z, said device further comprising a second condenser lens which condenses said reflected measuring rays after they have been passed through said objective lens and transmitted through said beam splitter, a second mirror which is located at a position corresponding to the condensing position of said second condenser lens, and which reflects said reflected measuring rays which have been condensed by the second condenser lens in the direction of −Z, a first driving means which moves said beam splitter and said first condenser lens in the directions of +/−X and a second driving means which moves said beam splitter, said first condenser lens and said second condenser lens in the directions of +/−Y.

7. An optical measuring device as claimed in claim 1, wherein said path inclination correcting means comprises a beam splitter which reflects said measuring rays propagating in the direction of an X-axis of an orthogonal X-Y-Z coordinate system, in the direction of Z, a first condenser lens which condenses said measuring rays which have been reflected by said beam splitter, a first mirror which is located at a position corresponding to the condensing position of said first condenser lens and which reflect said measuring rays condensed by said first condensing lens in the direction of −Z, said objective lens being located at such a position that said measuring rays advancing in the direction of −Z and reflected by said first mirror pass after they have been transmitted through said beam splitter, and said reflected measuring rays pass after they have been reflected by the surface of said object in the direction of Z, said device further comprising a second condenser lens which condenses said reflected measuring rays after they have been passed through said object lens and reflected by said beam splitter in the direction of X, a second mirror which is located at a position corresponding to the condensing position of said second condenser lens, and which reflects said reflected measuring rays condensed by the second condenser lens in the direction of −X, a first driving means which moves said beam splitter and said first condenser lens in the directions of +/−X and a second driving means which moves said beam splitter, said first condenser lens and second condenser lens in the directions of +/−Y.

* * * * *